United States Patent [19]
Lagoni et al.

[11] Patent Number: 5,422,680
[45] Date of Patent: Jun. 6, 1995

[54] NON-LINEAR CONTRAST CONTROL APPARATUS WITH PIXEL DISTRIBUTION MEASUREMENT FOR VIDEO DISPLAY SYSTEM

[75] Inventors: William A. Lagoni, Indianapolis, Ind.; Albert P. Pica, East Windsor; James R. Bergen, Hopewell, both of N.J.; Todd J. Christopher, Indianapolis, Ind.

[73] Assignee: Thomson Consumer Electronics, Inc., Indianapolis, Ind.

[21] Appl. No.: 296,074

[22] Filed: Aug. 24, 1994

Related U.S. Application Data

[63] Continuation of Ser. No. 887,453, May 22, 1992, abandoned.

[51] Int. Cl.$^6$ ............................................. H04N 5/202
[52] U.S. Cl. ................................. 348/674; 348/678; 348/687
[58] Field of Search ............... 348/615, 674, 625, 671, 348/687, 678, 675, 630; 358/163, 164, 166, 168, 169, 174, 32, 37; H04N 9/69, 9/77, 5/202, 5/235, 5/52, 5/57

[56] References Cited

U.S. PATENT DOCUMENTS

| | | | |
|---|---|---|---|
| 2,760,008 | 8/1956 | Schade | 179/171 |
| 4,337,514 | 6/1982 | Favreau et al. | 364/515 |
| 4,353,092 | 10/1982 | Bailey et al. | 358/160 |
| 4,489,349 | 12/1984 | Okada | 358/168 |
| 4,589,022 | 5/1986 | Prince | 358/166 |
| 4,686,562 | 8/1987 | Yamanaka | 358/32 |
| 4,829,381 | 5/1989 | Song | 358/164 |
| 5,003,394 | 3/1991 | Lagoni | 358/168 |

FOREIGN PATENT DOCUMENTS

| | | | |
|---|---|---|---|
| 019518 | 11/1980 | European Pat. Off. | H04N 5/20 |
| 0083865 | 7/1983 | European Pat. Off. | H04N 5/14 |
| 0400605 | 12/1990 | European Pat. Off. | . |
| 0459366 | 12/1991 | European Pat. Off. | H04N 5/57 |
| 0475465 | 3/1992 | European Pat. Off. | . |
| 0488542 | 3/1992 | European Pat. Off. | H04N 5/20 |

OTHER PUBLICATIONS

Type CX20125 Dynamic Picture Processing Integrated Circuit (Sony Corp.).

*Primary Examiner*—James J. Groody
*Assistant Examiner*—Sherrie Hsia
*Attorney, Agent, or Firm*—Joseph S. Tripoli; Peter M. Emanuel; Richard G. Coalter

[57] ABSTRACT

A video signal to be processed is applied to a non-linear processor having an adjustable gain responsive to a control signal over at least one portion of the amplitude range of the video input signal. A sampling circuit, responsive to the video signal, generates video samples related to the video signal. A control circuit, responsive to the video samples, generates the control signal in accordance with the number of samples in at least a given amplitude range thereby controlling the percentage of samples of a given range in displayed images. Plural control and sampling circuits may be included provide control for white stretch processing, black stretch processing and video mid-point processing for enhancing contrast through out the entire video signal range.

2 Claims, 8 Drawing Sheets

NON-LINEAR CONTRAST CONTROL APPARATUS WITH PIXEL DISTRIBUTION MEASUREMENT FOR VIDEO DISPLAY SYSTEM

This is a continuation of U.S. application Ser. No. 07/887,453 filed May 22, 1992, now abandoned.

FIELD OF THE INVENTION

This invention relates to television signal processing systems and particularly to non-linear signal processing systems for providing contrast enhancement in light and/or dark areas of displayed images.

BACKGROUND OF THE INVENTION

Non-linear video signal processors are known wherein a video signal is subjected to non-linear amplification within selected portions of the video signal range for providing improved contrast in displayed images.

O. H. Shade, for example, describes a non-linear video processor featuring both so-called "black stretch" and "white stretch" processing for improving detail in the darker and lighter areas of displayed images in U.S. Pat. No. 2,760,008 which issued Aug. 21, 1956. "Black stretch" is a term used to describe the non-linear processing of the luminance portion of a video signal such that the luminance signal gain is increased for middle valued luminance levels thereby providing improved contrast. In a similar manner, improved detail within lighter areas of displayed images is provided by increasing the luminance signal gain for video signals of relatively high level to "stretch", in a manner of speaking, the signal range of bright portions of displayed images. An advantage of the Shade system is that there is great flexibility in the choice of video signal transition points or "break points" as well flexibility in controlling video signal gain levels between the break points of the overall transfer function.

Although the Shade system provides improvement in the control of detail for dark scenes and light scenes, there are a relative large number of manual controls which require adjustment to realize these advantages. These include controls for gain setting and controls for threshold or "break point" setting. Proper adjustment of the overall system can be relatively complex due to the numerous manual controls involved.

More recently, integrated circuits have become available providing non-linear picture enhancement functions which feature some measure of automatic control so as to relieve the user of the burden of adjusting a number of individual controls. An example of such an integrated circuit is the type CX20125 "dynamic picture processing" integrated circuit manufactured by Sony Corp. This integrated circuit provides "black stretch" processing for improving contrast of lower level video signals. Briefly, after stripping sync from the video signal, the deepest black level is detected by a black peak hold circuit and it becomes the control signal of a gain control circuit and forms a feedback loop to perform black expansion automatically as a function of detected black peaks of the video signal.

Another approach to automatic control of non-linear processing for improved contrast in brighter picture areas is based upon analysis of the so-called "average picture level" (APL) of displayed images. Examples of "white stretch" processors, which improve detail in brighter picture areas are described, for example, by Lagoni In U.S. Pat. No. 5,003,394 entitled DYNAMIC VIDEO SYSTEM INCLUDING AUTOMATIC CONTRAST AND "WHITE STRETCH" PROCESSING SECTIONS which issued Mar. 26, 1991. In an embodiment of the Lagoni system white stretch processing is performed as a function of the average picture level (APL) of displayed images and contrast control is effected both by a user control signal source and a peak white signal detector in response to displayed images.

Other examples of non-linear processing are provided, for example, by Bell and Lagoni, in U.S. patent application Ser. No. 808327 filed Dec. 16, 1991 and entitled NON-LINEAR LUMINANCE SIGNAL PROCESSOR RESPONSIVE TO AVERAGE PICTURE LEVEL (APL) OF DISPLAYED IMAGE. A further example is described by Lagoni and O'Brien in U.S. patent application Ser. No. 808328 filed Dec. 16, 1991 and entitled VIDEO SYSTEM WITH FEEDBACK CONTROLLED "WHITE STRETCH" PROCESSING AND BRIGHTNESS CONTROL. In such systems, improved contrast in bright areas of a picture are provided by controlling the luminance signal gain in such areas as a function of the average picture level (APL) of the images that are displayed.

SUMMARY OF THE INVENTION

Generally speaking, the foregoing automatic non-linear processing systems provide relatively substantial improvements in displayed images. It is herein recognized, however, substantial further improvement is possible and particularly so with regard to generation of control signals for controlling the non-linear transfer function generator of the system.

In particular, it has been discovered through viewer tests that viewers tend to prefer images processed to provide particular percentages of pixels within particular brightness ranges. In order to be able to control the relative numbers of dark, medium and light picture elements in an image, it has been found that the conventional methods of black peak detection and average picture level detection are not adequate.

The present invention resides, in part, in the discovery that a need exists for a non-linear video signal processing system which more fully takes into account the whole contents of video images so as to enable control of the relative percentages of pixels within one or more brightness ranges.

Apparatus for processing a video signal, in accordance with the invention, includes non-linear processing means having an adjustable gain responsive to a control signal over at least one portion of the amplitude range of a first video signal and a sampling means responsive to said video signal for generating video samples related to said video signal. A control means is provided, responsive to said video samples, for generating said control signal in accordance with the number of said video samples in at least a given amplitude range.

In embodiments of the invention herein described, the control signal is shown to be applied both in a "feed forward" manner (which has the advantage of unconditional stability) and in a "feedback" manner (which has the advantage of self regulation of output signal levels). Also, as will be explained, circuit implementation may be by analog or digital form and there may be a plurality of different segments of the non-linear transfer function controlled by respective measurement and control circuits so as to provide both black stretch processing and white stretch processing.

BRIEF DESCRIPTION OF THE DRAWING

The foregoing and additional features of the invention are illustrated in the accompanying drawing in which like elements are denoted by like reference designators and in which.

DETAILED DESCRIPTION

Figure 1:
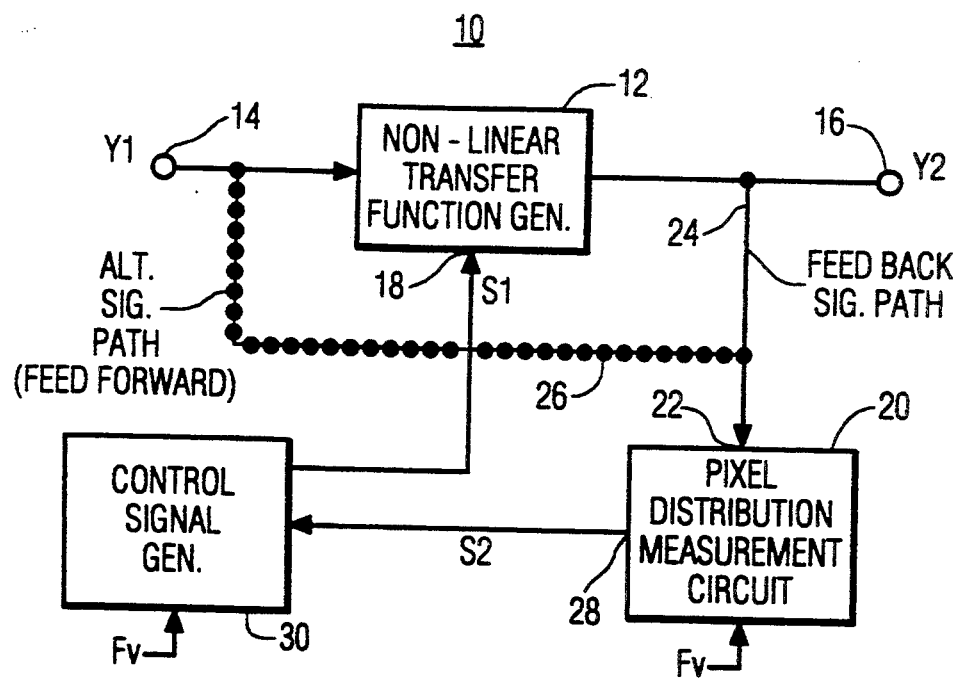
FIG. 1 is a block diagram of a black stretch (non-linear) video signal processing system embodying the invention.

The system 10 of FIG. 1 provides "black stretch" contrast enhancement and includes a non-linear transfer function generator 12 having an input terminal 14 for receiving a luminance input signal Y1 and having an output terminal 16 for providing a luminance output signal Y2 which is subjected to non-linear processing for contrast enhancement in accordance with a control signal S1 applied to a control input 18 thereof.

The control signal S1 is developed by means of a pixel distribution measurement circuit 20 having an input 22 which is coupled via a feedback path 24 (indicated by a solid line) to the output terminal 16 for receiving the processed output signal Y2. In the alternative, the input 22 of circuit 20 may be connected to the input terminal 14 for receiving the video input signal Y1 by means of a "feed forward" signal path 26 indicated by a dotted line. An advantage of using the feed forward path is that the overall system is unconditionally stable. An advantage of using the feedback signal path 24 for the input of circuit 20 is that the overall system is "self regulating", so to speak, for maintaining the desired percentage of "black" picture elements with respect to the total number of picture elements in an image field. The output signal S2 at output 28 of pixel distribution measurement circuit 20 is coupled via a control signal generator 30 which produces the control signal S1.

Figure 2:
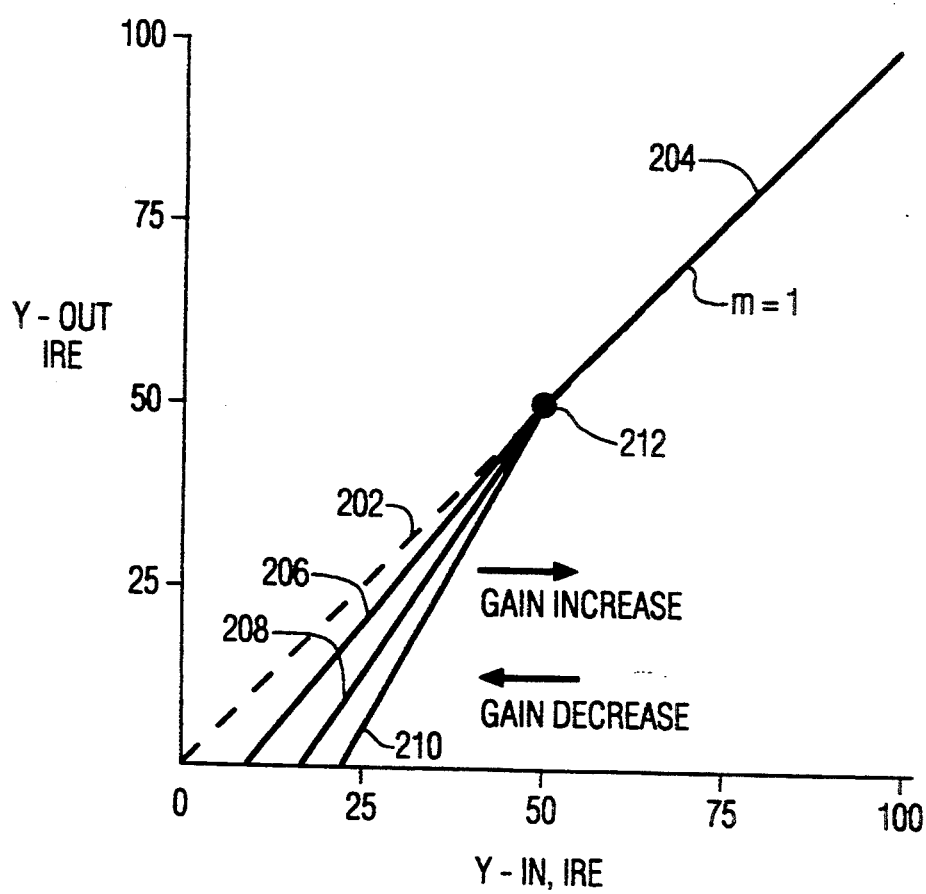
FIG. 2 is a transfer function diagram illustrating operation of the black stretch processor of FIG. 1.

In operation, the non-linear "processor" or transfer function generator 12 subjects the video input signal Y1 to gain variation over a portion of the signal range of signal Y1 as indicated by the transfer function of FIG. 2. As shown, as the control signal S1 varies, the gain imparted to signal Y1 varies also in the region below 50 IRE units. For example, when the control signal is zero, the transfer function is along the path of segments 202–204 which represents unity gain. For a higher value of the control signal S1 more gain is applied to the lower segment of the transfer function as indicated by segments 206, 208 and 210. This increase in gain for darker regions of an image enhances the contrast of pixels that are amplified (i.e., those along segments 206 to 210) and forces pixels to black level that are below the intersection of the transfer function and the horizontal axis. For example, pixels in the range of zero to 20 IRE level are translated to zero IRE level for the transfer function 210 while those in the range of 20 to 50 IRE units are amplified and so enjoy increased contrast when displayed. The break point of the transfer function, at point 212, is located at the 50 IRE level in this example and input signals above this level are linearly amplifier with no gain or loss as indicated by the unity slope line (m=1) between point 212 and the 100 IRE level.

Briefly stated, the control signal S1 that controls the black stretch signal processing is generated by the combination of circuit 20 which samples the video signal (Y2 or, alternatively Y1) and generates video samples S2 related to the video signal and the circuit 30 which generates the control signal in accordance with the number of samples occurring in a given amplitude range.

In more detail, the pixel distribution measurement circuit 20 responds to the video input signal supplied thereto (Y1 or, preferably Y2) for generating a count representative of the total number of picture elements that occur within a given time interval of at least one field interval and which have video signal levels that are equal to or less than a given video reference level (e.g., 7.5 IRE, the black set-up level). The control signal generator 30, also operating at the video field rate Fv, compares the count S2 developed by the pixel distribution measurement circuit 20 with a given percentage (e.g., 10%) of the total number of picture elements occurring within the given time interval (one field) and develops the control signal S1 in accordance the comparison. This control signal S1 is then applied to generator 12 for altering the transmission characteristics thereof (as shown in FIG.2) in a sense to adjust the black pixel content of signal Y2 so as to contain a desired number of pixels (e.g., 10%) which have amplitudes at or below the given video reference level (e.g., black level).

Figure 3:
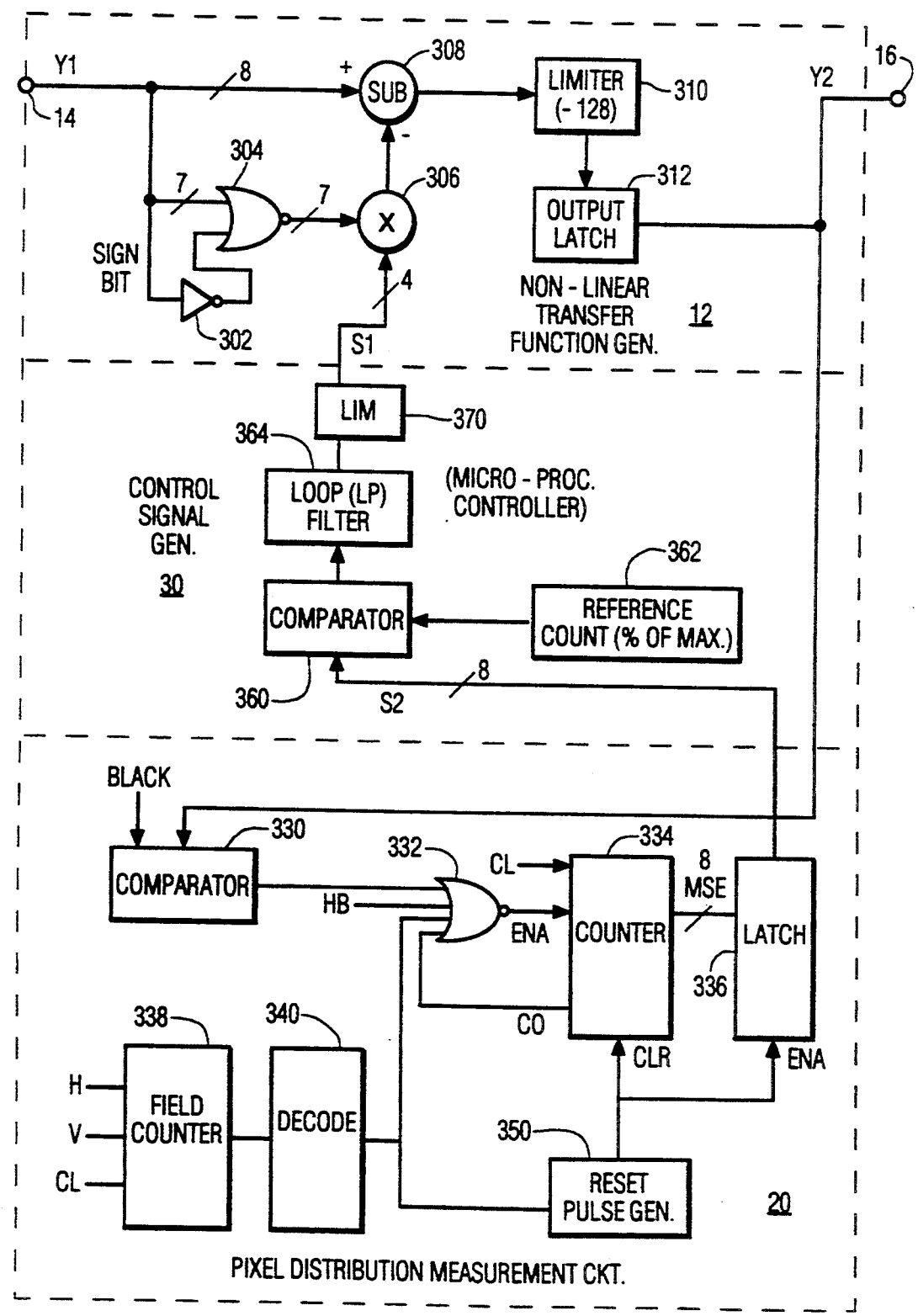
FIG. 3 is a block diagram of a digital circuit implementation of the black stretch processor of FIG. 1.

FIG. 3 illustrates a digital circuit implementation of the black stretch processor of FIG. 1. In FIG. 3 non-linear transfer function generator 12, control signal generator 30 and pixel distribution measurement circuit 20 are all outlined by phantom lines to simplify the explanation.

The transfer function generator includes a sign bit inverter 302, and an 8-input NOR gate. The luminance input signal Y1 comprises an 8-bit signal the LSB's of which are applied to 7 inputs of NOR gate 304 with the 8th bit being inverted by inverter 302 and applied to the eighth input of gate 304. This structure limits positive values of the signal Y1 (50–100 IRE) and inverts the negative values (binary −127 to −1, or 0–50 IRE). The resultant signal thus contains signal only in the range of 0–50 IRE and is clipped (constant) otherwise. This signal is then multiplied by a two quadrant multiplier 306 with the control signal S1 (e.g., 4 bits) to provide a variably amplifier output signal for input signals in the 0-50 IRE range. This signal is then subtracted from the original input signal Y1 by subtractor 308 thereby providing an output signal in which the lower portion (0-50 IRE) thereof is variably amplified by signal S1 and the upper portion (50-100 IRE) thereof is linearly translated at unity gain as is shown by the transfer characteristic curve of FIG. 2. Since the subtraction operation may produce negative results, the output of subtractor 308 is applied to a limiter which limits at zero IRE (e.g., −128 in signed binary) and the processed signal Y2 is then stored in an output latch 312 clocked at the system pixel rate.

The pixel distribution measurement circuit 20 in FIG. 3 includes a comparator 330 which compares the video samples (Y2) with a black level reference signal and supplies pulses via NOR gate 332 to a counter when the signal Y2 is in the black level range. The counting of counter 334 is done on a field basis controlled by a field counter 338 and decoder 340 and the total count of black pixels in a field is stored in an output latch 336 at the end of a field by means of a reset pulse generator 350. To ensure that only active video samples are counted, a horizontal blanking signal is applied to gate 332 which stops the count during blanking. Also, overflow is avoided by feedback from the carry out (CO) of counter 334 to another input of gate 332. Accordingly, once each field, the count stored in latch 336 is representative of the total number of black pixels of the video signal Y2 (or Y1 if the feed forward signal path is chosen rather than the feedback path).

The control signal generator 30 in FIG. 3 is shown in block diagram form to illustrate the various functions and, in practice, may be implemented by means of a micro processor (not shown). Generator 30 includes a comparator 360, a reference count source 362 (e.g., a ROM) and a loop filter 364. The pixel count signal S2 provided by circuit 20 is compared by comparator 360 with the reference count provided by reference 362 which represents, for black stretch purposes, 10% of the total number of pixels in one field and the result of the comparison is coupled as control signal S1 to generator 12 by means of a loop filter (e.g., a low pass filter) 364 to generator 12. If the comparison indicates that there are fewer than 10% black pixels in a field, the gain of generator 12 is increased to thereby increase the number of black pixels. Conversely, if the comparison indicates that there are more than 10% black pixels in a field, the control signal S1 decreases the gain of generator 12. The system is thus self regulating to maintain a given percentage of black pixels in a field. To avoid exceeding reasonable gain limits, a limiter 370 may be included at the output of generator 30 to limit the control signal range. A suitable range is from zero to about 20 IRE units. Alternatively, the limiting function may be provided in the non-linear transfer function generator 12 if desired.

Figure 4:
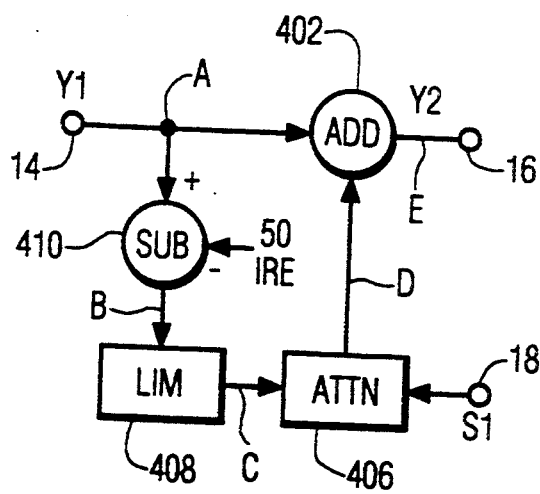
FIG. 4 is a block diagram of an alternative embodiment of a nonlinear function generator suitable for use in the example of FIG. 1.

The alternative transfer function generator of FIG. 4 comprises an adder 402 having an input coupled to terminal 14 for receiving the input signal Y1, having an output coupled to terminal 16 for providing the non-linearly amplifier output signal Y2 and having a second input coupled via an attenuator (to which control signal S1 is applied) 406, a limiter 408 and a subtractor 410 to terminal 14.

Figure 5C:
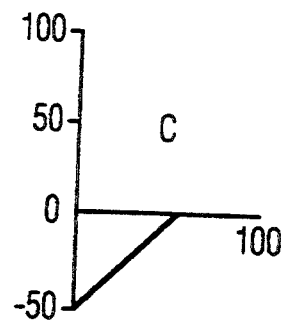
FIGS. 5A–5E at signal level diagrams illustrating operation of the transfer function generator of FIG. 4.
Figure 5A:
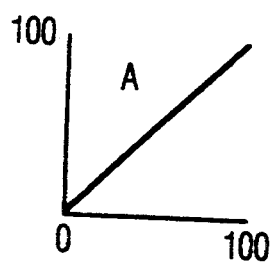
Figure 5D:
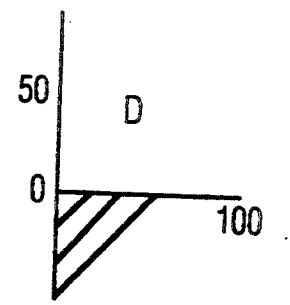
Figure 5B:
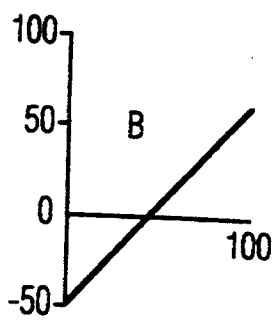
Figure 5E:
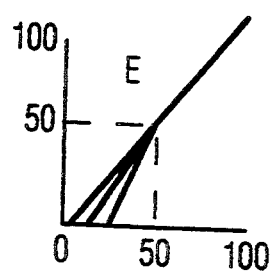

Operation of the generator 14 of FIG. 4 is illustrated by diagrams 5A-5E. FIG. 5A illustrates signal Y1 at terminal 14 (point A) This signal is level shifted by −50 IRE by subtractor 410 as shown in FIG. 5B and then limited by limiter 408 as shown in FIG. 5C. Variable gain is obtained by means of attenuator 406 responsive to control signal S1 as shown in FIG. 5D. Finally, by adding the signals at points A and D (FIGS. 5A and 5D) the result (FIG. 5E) is produced at the output of adder 402. As seen, this is the same desired transfer function is shown in FIG. 2 and produced by the digital circuit of FIG. 3.

Figure 6:
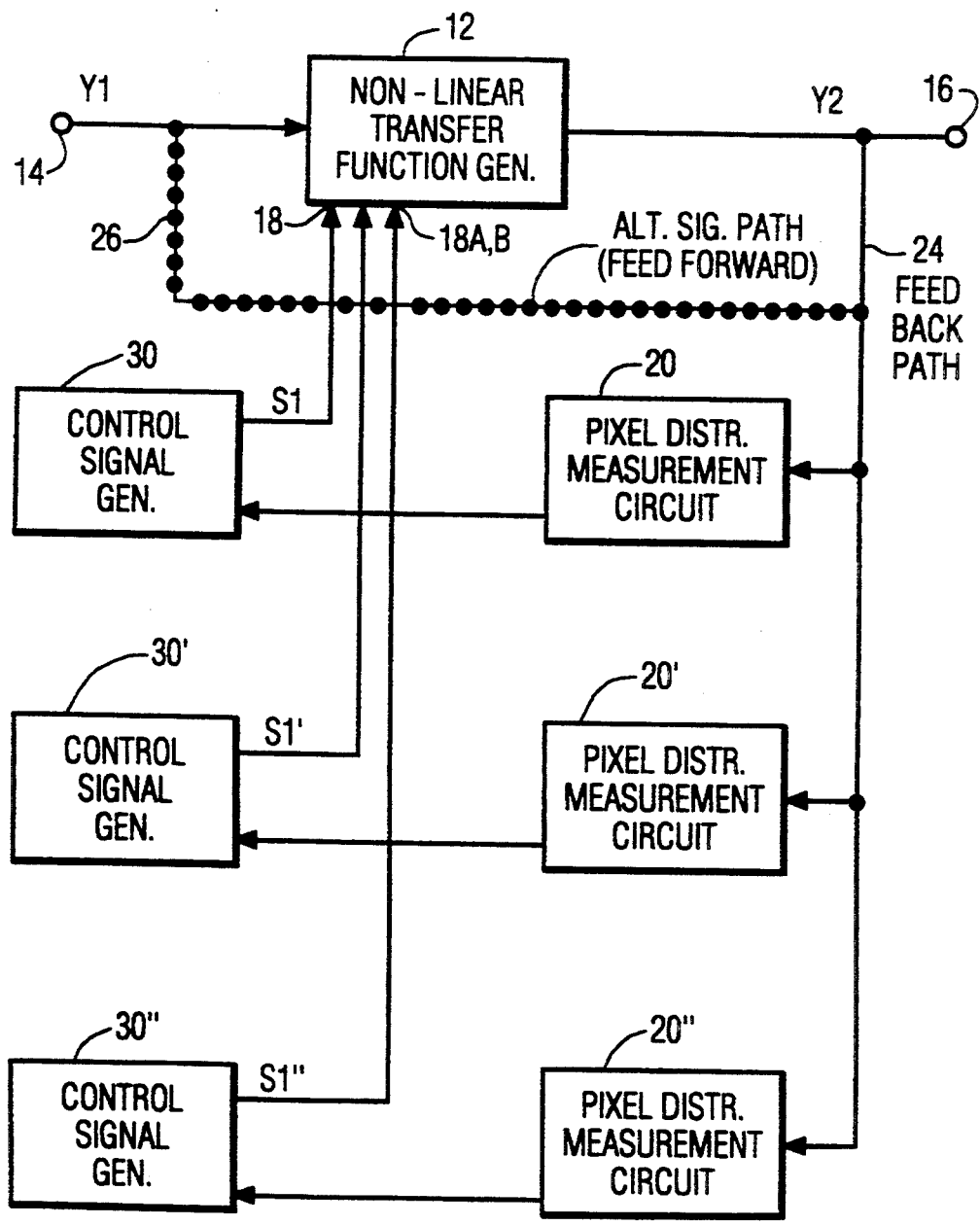
FIG. 6 is a block diagram of video signal processing system embodying the invention for providing both black stretch and white stretch processing of a video signal.

FIG. 6 illustrates a modification of the system of FIG. 1 to provide white stretch processing and control of the mid-level (50 IRE) breakpoint. The modification comprises the addition of two more pixel distribution measurement circuits 20' and 20" as well as two more control signal generators 30' and 30". Also, the transfer function generator 12 is modified to provide two more inputs 18A and 18B for controlling the mid point (50 IRE) and white stretch gains. Except for these changes and the use of other bias and reference levels, operation is much the same as for the example of FIG. 1 and is illustrated in the transfer function exemplified by FIG. 7.

Figure 7:
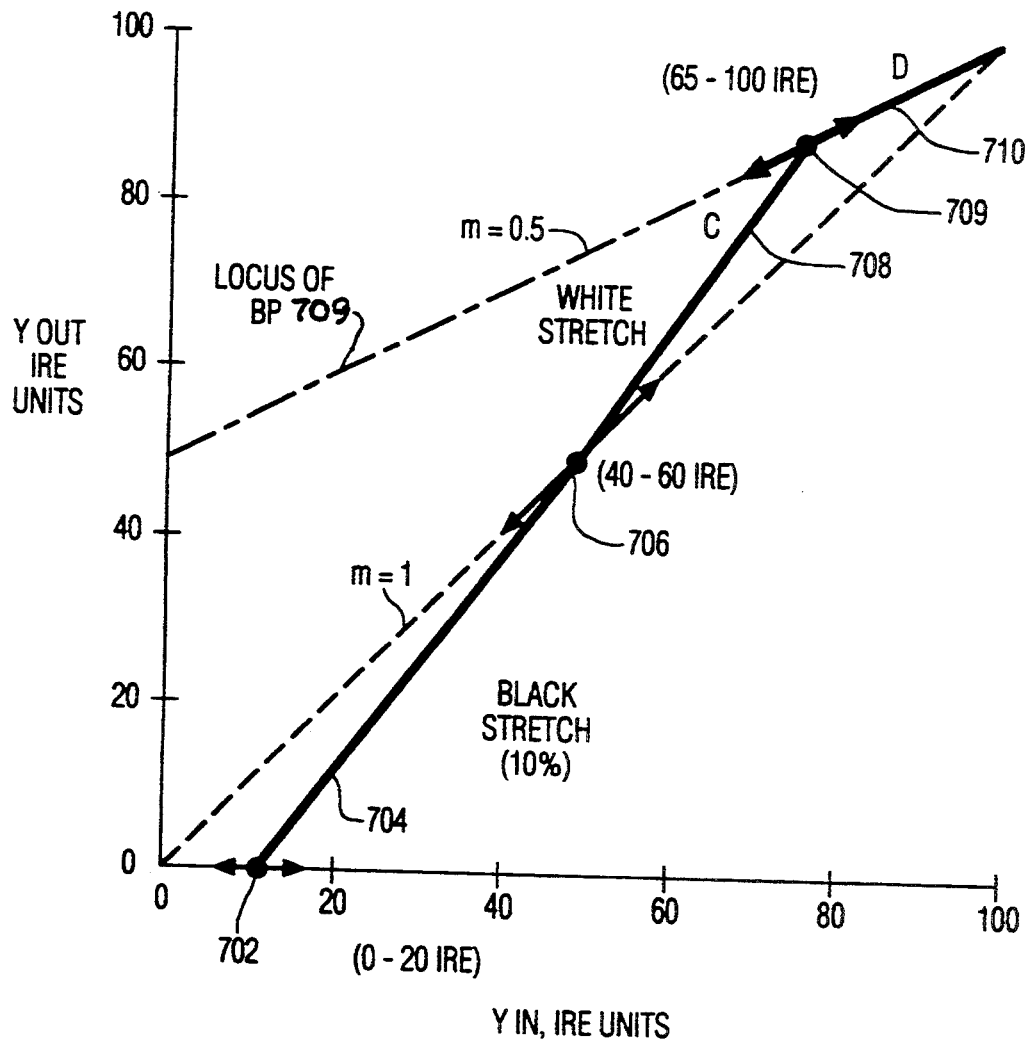
FIG. 7 is a transfer function diagram illustrating the operation of the embodiment of FIG. 6.

As shown in FIG. 7 the black stretch processing varies the position of the break point 702 which moves along the horizontal axis in the range between 0-20 IRE input level thus changing the slope (gain) of the black stretch transfer function 704 which extends to about 50 IRE. Here, however, to provide freedom of adjustment of mid level video signals the point 50 IRE (point 706 is controlled by signal S1' so as to move along a path having a slope of unity gain within the range from 40 to 60 IRE. The control signal S1" controls the slope of the white stretch segment 708 by moving the break point 709 (BP709 in FIG. 7) in the range of 65-100 IRE along the path of slope m=0.5 (6 db attenuation). The black stretch reference level is, as before, set to 7.5 IRE for counting black pixels and the output is regulated in generator 30 at the previous level of 10% of the total number of pixels per field. Circuit 20', which controls the center point 706 uses a reference level of 50 IRE for pixel detection and counting and generator 30' regulates the center point video level at 75% of the total number of pixels per field. Finally, the measurement circuit 20" is provided with a threshold level of about 90 IRE for detection and control is by comparison of number of 90 IRE pixels with about 95% of the total number of pixels per field. The preferred limits to the three control ranges are 0-20 IRE for black stretch (point 702) variation, 40-60 IRE for movement of the mid point value and 65-100 IRE for variations of point 709 under white stretch control.

Figure 8:
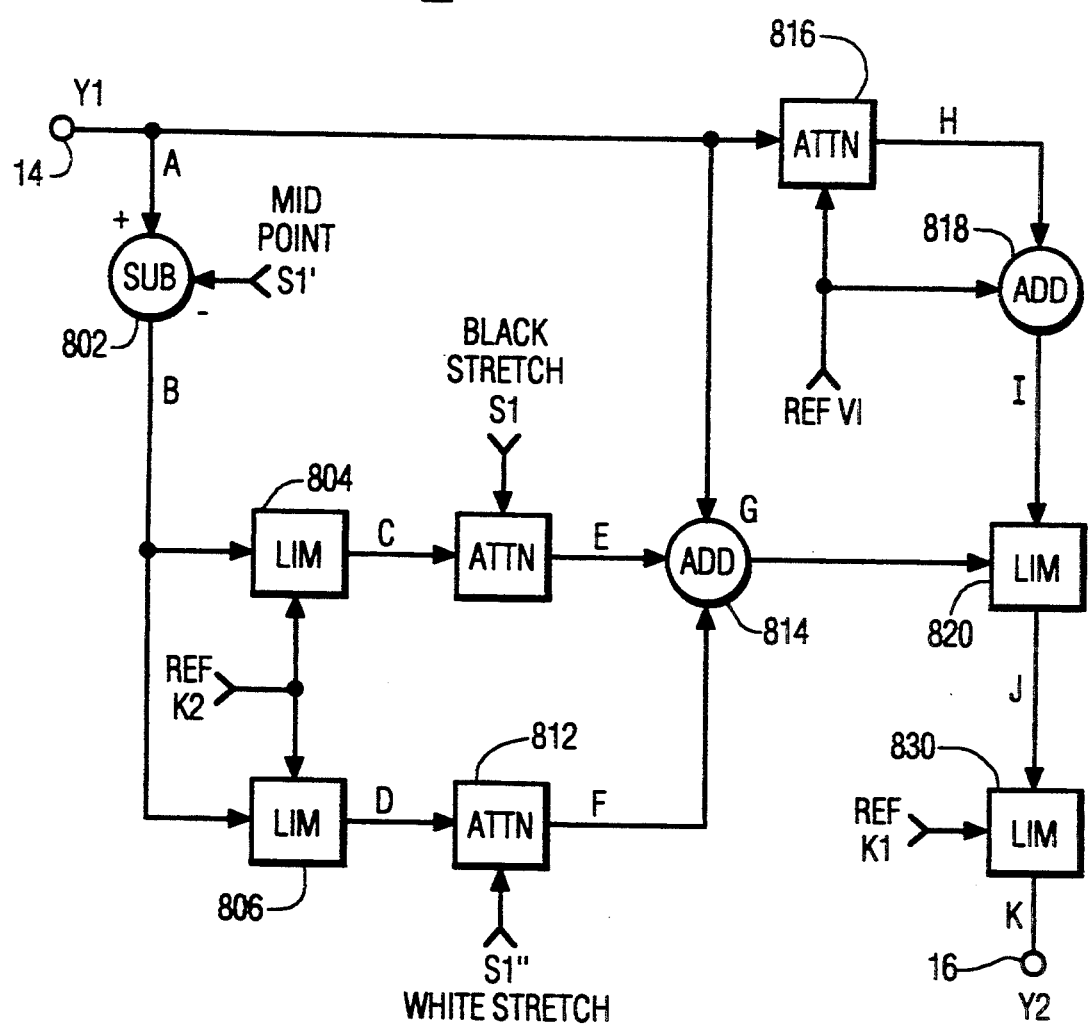
FIG. 8 is a block diagram of a non-linear transfer function generator suitable for use in the example of FIG. 6.
Figure 9A:
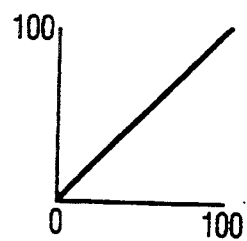
FIGS. 9A–9K are signal level diagrams illustrating operation of the non-linear transfer function generator of FIG. 6.
Figure 9H:
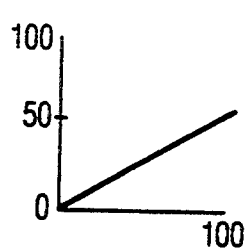

Control of the various segments and break points in the example of FIG. 6 requires additional control inputs for the non-linear processor 12 as previously explained. FIG. 8 is a block diagram of an exemplary implementation of the modified processor. FIGS. 9A-9K show exemplary signal levels at the points marked A-K in FIG. 8. FIG. 9A shows the input signal Y1 as applied to the input of subtractor 802. This subtractor 802 offsets the incoming video signal Y1 downward by the value of control signal S1' as shown in FIG. 9B and produces the appropriate variation of break point 706 (FIG. 7). The offset signal provided by subtractor 802 is applied to a limiter 804 that truncates the signal (see FIG. 9C) to values below the origin (0 IRE) as denoted by constant K1 applied to the limiter. Attenuator 810 multiplicatively controls the slope of the signal C responsive to the black stretch signal S1 to produce the variable slope signal E of FIG. 9E and thus produces the degree of black stretch proportional to signal S1. In this way the control voltage (signal S1) indirectly determines the break point 702 along its locus (0 to 20 IRE).

The function of limiter 806 is to truncate the signal at B to values above the origin (0 IRE as set by reference K1 noted above). This is shown by FIG. 9D. Attenuator 812 multiplicatively controls the slope of the signal D and to produce the variable signal F (see FIG. 9F) and thus produces the degree of white stretch responsive to the signal S1" applied to the attenuator. In this way the control voltage S1" indirectly determines the break point 709 (see FIG. 7).

Figure 9G:
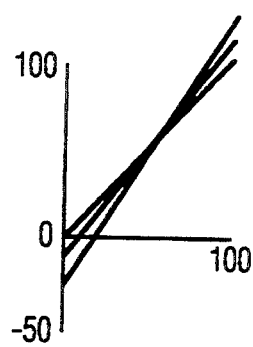
Figure 9B:
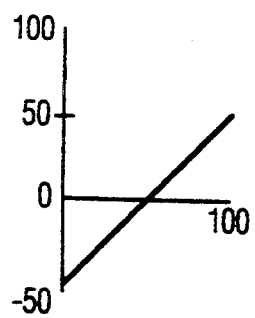
Figure 9I:
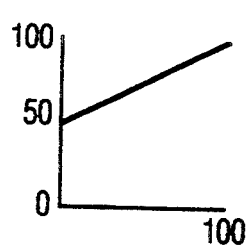
Figure 9C:
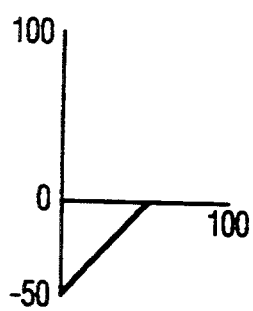
Figure 9E:
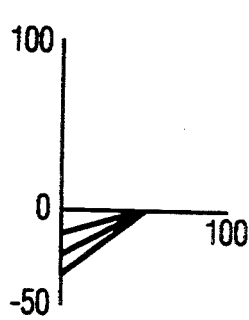
Figure 9J:
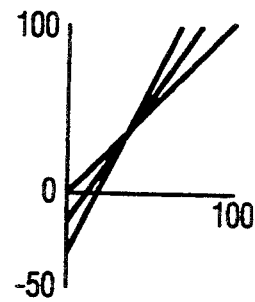
Figure 9D:
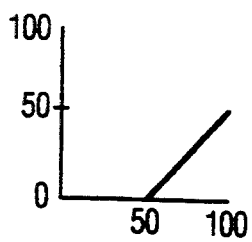
Figure 9F:
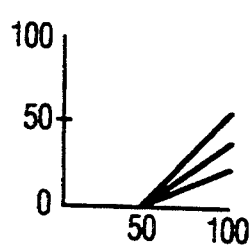
Figure 9K:
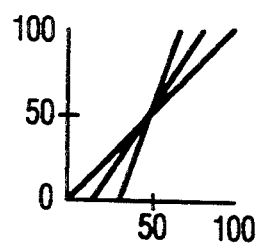

Adder 814 sums the black stretch portion of the signal E;, the white stretch portion of the signal (F) and the original (linear) input signal Y1 (FIG. 9A) to produce the sum signal shown in FIG. 9G. The locus along which break point 709 is controlled is determined by an attenuator 816 (see FIG. 9H) and an adder 818 which sets the slope of 0.5 in FIG. 7. This slope is determined by a constant (reference voltage) V1 applied to attenuator 816 and adder 818 to produce the signal shown in FIG. 9I which is offset and has a slope of 0.5. A limiter 820 receives signals G and I and produces an output signal (J) shown in FIG. 9J which is lesser in value. Stated differently, limiter 820 truncates the signal G to be at or below that of signal I. Finally, another limiter 830 (referenced to the zero IRE value of reference signal K1) truncates the signal (J) to values at or above 0 IRE as shown in FIG. 9K.

Figure 10:
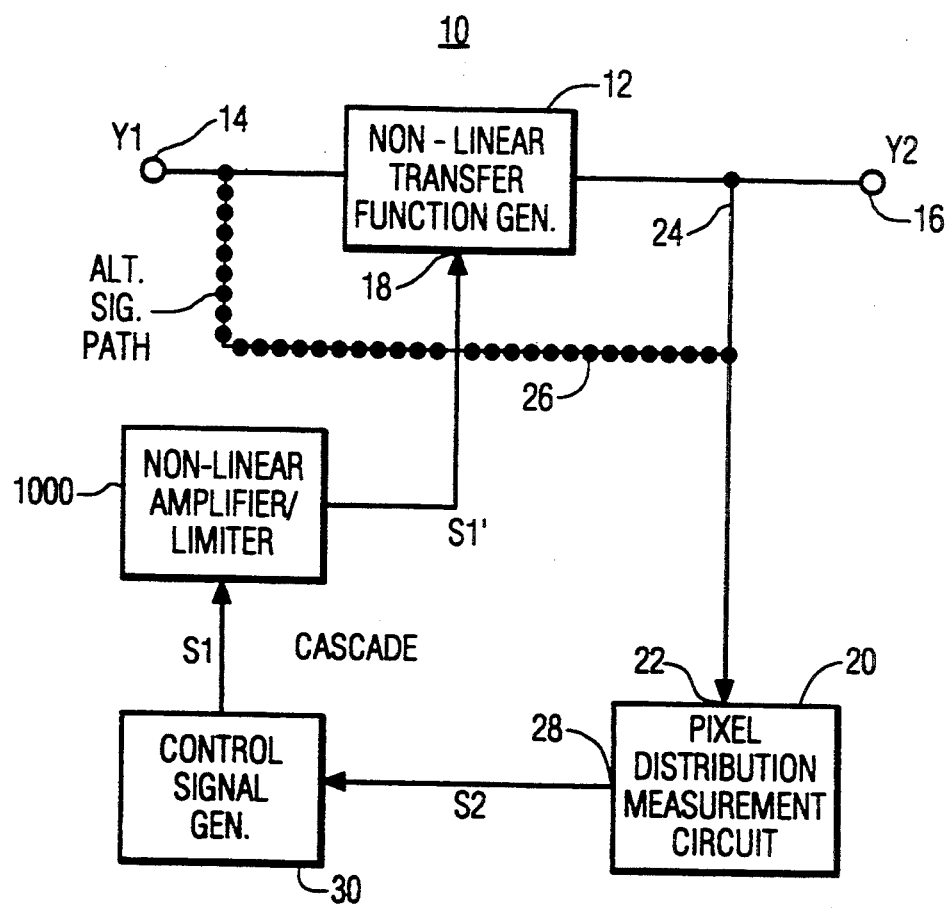
FIG. 10 is a block diagram illustrating another modification of the system of FIG. 1.
Figure 11:
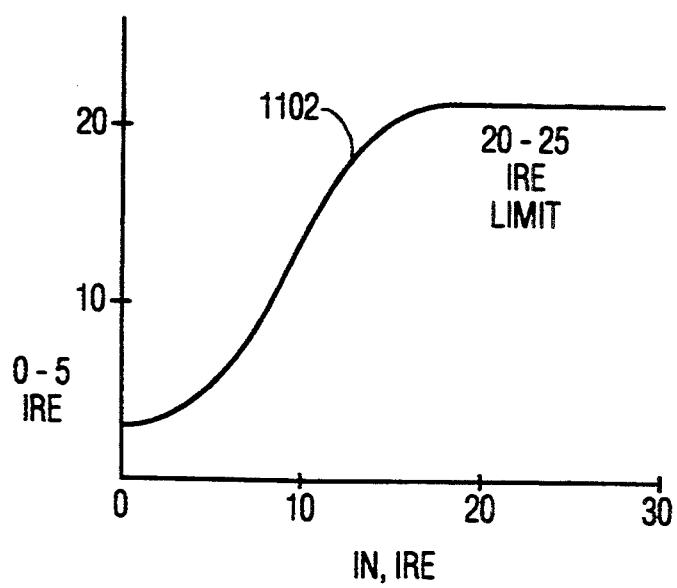
FIG. 11 is a transfer function diagram of an element of the example of FIG. 10.

In FIG. 10 the non-linear video signal processing of FIG. 1 is modified to include a non-linear amplifier and limiter 1000 in the control signal path between the control signal generator 30 and the control input 18 of the non-linear transfer function generator 12. The transfer function of the amplifier/limiter 1000 is illustrated by curve 1102 in FIG. 11 where it is seen that the control signal range for signal S1 is restricted to a minimum value between 0 and 5 IRE units at the lowest level and is limited to 20 IRE units at the highest level. The transfer function between the lowest and highest levels increases non-linearly so as to emphasize control signal values in the range of 10 to 20 IRE and the de-emphasize control signal values in the range of 0 to 10 IRE. The 20 IRE limitation ensures that excessive black stretch can not be applied under the worst case condition (i.e., a pure white raster). The non-linearity provides the effect of lessening the black stretch for images that are reasonably close to having the desired percentage of black pixels but rapidly increasing the black stretch for pictures substantially lacking blacks. Advantageously, this extra non-linearity in the system tends to make the operation of automatic stretching less noticeable or more "smoother" acting. Non-linear processing of the white stretch control signal may also be applied to the embodiment of FIG. 6.

What is claimed is:

1. A video signal processing system for use in a given apparatus, comprising:
   first means responsive to a given one of a video input signal and a video output signal of said system supplied thereto for generating a count representative of the total number of picture elements that occur within a given time interval of at least one field interval of said given video signal and which have video signal levels that lie within a predetermined range of values with respect to a given video reference level;
   second means for comparing the count of said first means with a given percentage of the total number of the picture elements occurring within said given time interval for generating a control signal;
   controllable means, having a controllable transmission characteristic and having a control input to which said control signal is applied for altering the transmission characteristic of said video input signal supplied to said controllable means in a sense to said form a video output signal representative of images having selected response characteristics controlled as a given function of said count; and wherein:
   said given apparatus comprises a television picture reproducing apparatus;
   said use in said apparatus comprises contrast modification of the images produced by said apparatus;
   said contrast modification is non-linear for altering the contrast of areas of one brightness level of said images differently than areas of another brightness level:
   said predetermined range of values comprises values equal to or less than said given video reference level;
   said controllable means comprises a non-linear transfer function generator having an input coupled for receiving said video input signal;
   said given video signal applied to said first means is taken from said video output signal produced by said non-linear transfer function generator for causing said video signal processing system to be subjected to feedback control of the contrast of said video output signal so as to provide a predetermined percentage of black pixels in displayed images.

2. A non-linear video signal processor, comprising:
   a non-linear transfer function generator (12) having an input (14) for receiving a video input signal (Y1) to be processed and having an output (16) for providing a processed video output signal (Y2), said non-linear transfer function generator having a control input (18) for receiving a control signal (S1) for controlling the transfer function of said non-linear transfer function generator;
   a pixel distribution measurement circuit (20) having an input (22) connected to said output (16) of said non-linear transfer function generator (12) and having an output (28) for providing a pixel distribution indicating signal (S2) representative of a percentage of black level pixels in said processed video output signal (Y2); and
   a control signal generator (30) having an input connected to receive said output (28) of said pixel distribution measurement circuit and having an output connected to supply said control signal (S1) to said control input (18) of said non-linear transfer function generator (12) for regulating the percentage of black level pixels in said processed video output signal (Y2).

* * * * *